United States Patent Office

3,786,078
Patented Jan. 15, 1974

3,786,078
EXTRACTION OF OIL FROM OIL BEARING SEEDS
De Wayne W. Finley, Harvey E. Smith, and Owen L. Fishwild, Clinton, Iowa, assignors to Standard Brands Incorporated, New York, N.Y.
No Drawing. Filed Nov. 9, 1970, Ser. No. 88,191
Int. Cl. C11b 1/00
U.S. Cl. 260—412.4                                8 Claims

ABSTRACT OF THE DISCLOSURE

The disclosure is directed to a method of extracting oil from oil bearing vegetable materials. Oil bearing vegetable material having a moisture content below 5 percent is ground and moisturized to a moisture level of up to 9 percent. The material is then subjected to mechanical action to rupture the cells containing the oil and the oil is extracted therefrom by the use of a solvent.

---

The present invention is directed to a method of extracting oil from vegetable materials.

There are a number of methods disclosed in the art for extracting oil from vegetable materials. The method principally being used commercially involves pressing the vegetable material to expel the oil and, in some cases, an additional step of treating the vegetable material with a solvent to remove additional oil. Prior to pressing, the vegetable material may be steamed in order to soften it so that the oil can be expelled therefrom more easily. When the oil is expelled, for instance by the use of a continuous or screw type expeller, there is a substantial increase in the temperature of the oil. These temperatures tend to cause the oil to become highly colored, i.e., a more pronounced red. The increase in color is generally a manifestation of the degree to which the oil is oxidized. Also, due to the pressures employed for expelling the oil there tends to be present large quantities of "foots" and insoluble fines. This requires the oil to be filtered in order to remove at least a portion of these materials.

Canadian Pat. 763,968 discloses a process for removing oil from vegetable material which allegedly overcomes some of the problems associated with the processes currently in use. In this process, vegetable material is comminuted so that it will pass through a 20 mesh screen and slurried with hexane at a temperature of 175° to 260° F. under a pressure in excess of the vapor pressure of hexane at these slurry temperatures. Although it was reported in this patent that such a treatment results in substantially complete removal of the oil from the vegetable material, there are various attendant problems associated with this process. For example, because of the pressures employed and the volatility of hexane, the extraction must be carried out in pressure vessels and the vessels must be maintained under leak-proof conditions because of the explosive nature and the flamability of hexane under these conditions.

It is the principal object of the present invention to provide a process for the extraction of oil from vegetable material wherein substantially complete removal of the oil from the vegetable material is achieved.

A still further object of the present invention is to provide a process for the extraction of oil from vegetable material wherein no substantial oxidation of the oil occurs.

Another object of the present invention is to provide a process for the extraction of oil from vegetable material wherein the process is carried out under atmospheric conditions.

In enumerating the objects of the present invention, it should be distinctly understood that the attainment of more than one of the objects depends upon the particular embodiment of the invention practiced.

Broadly, the present invention comprises grinding an oil-bearing material having a moisture content of below about 5 percent, moisturizing the ground material to a moisture level of up to 9 percent, subjecting the material to mechanical action to rupture the cells containing the oil in the material and extracting the oil from the material by the use of a solvent.

Although the present process is applicable for extracting oil from a variety of oil-bearing vegetable materials it is contemplated that its greatest utility would be in extracting oil from oil-bearing seeds such as sun flower, soybeans, corn germ and the like.

The preferred oil-bearing seed for use in the present process is corn germ.

The moisture content of vegetable material should be less than about 5 percent and preferably less than about 3 percent prior to the material being ground. If the moisture content of the material is higher than these levels, grinding is difficult to accomplish and there is the tendency of the material to merely deform. When the material is deformed there is no substantial decrease in the particle size of the material. Typically, the vegetable material is ground to a particle size such that it will pass through a No. 8 U.S. Standard Screen, and preferably the material is ground to particle size such that it will pass through a No. 10 U.S. Standard Screen.

After the grinding step, the material is moisturized to a moisture content of up to about 9 percent and preferably to a moisture content in the range of from about 6 to about 8 percent. This moisturizing step is necessary in order that disruption of the oil-bearing cells in the vegetable material can be efficiently accomplished. Moisturizing can be accomplished by simply spraying water on the ground material.

Disruption of the oil-bearing cells in the vegetable material may be accomplished in any convenient manner, such as by passing the material through flaking rolls. Preferably, vegetable material prior to being passed through the flaking rolls is heated to a temperature in the range of from about 100° to about 220° F.

After the vegetable material is flaked, it is extracted by the use of a solvent. Typically, the extraction process will be carried out by the use of hexane under atmospheric pressure. The length of time that the extraction is carried out is dependent upon a number of factors, but principally is dependent upon the length of time necessary to extract the maximum amount of oil from vegetable material. Typically, the temperature of the solvent during the extraction will be in the range of from about 120° to about 130° F. Preferably, the extracted material contains less than about 2 percent residual oil.

Extraction may be accomplished by the use of apparatus well known in the art such as counter-current extractors, column extractors, etc. Preferably, conditions are maintained so that the solvent exiting the extraction vessel contains from about 18 to about 40 percent oil.

Any residual solvent remaining in the extracted material may be removed therefrom by heat or by other conventional means. The material may then be dried and used as animal feed. Because of the mild conditions under which the present process is performed, there is little or no denaturation of the protein in the material so that extracted vegetable material contains a large amount of digestible protein.

The solvent may be removed from oil by standard techniques, such as by evaporation.

In order to more clearly describe the nature of the present invention, a specific example will hereinafter be described. It should be understood, however, that this is done solely by way of example, and is intended neither to delineate the scope of the invention nor limit the ambit of the appended claims. In the example and throughout

EXAMPLE I

Corn germ containing 2 percent moisture from a wet milling process was ground to reduce the particle size thereof and screened through a No. 10 U.S. Standard Screen. The particles were heated to a temperature of 100° to 220° F., sprayed with water to achieve a moisture content of 6 to 8 percent, and passed through flasking rolls in order to rupture the cells containing the oil. The flakes were conveyed into a Blaw-Knox counter-current extractor (Blaw-Knox 24 foot extractor) and the flakes extracted by the use of hexane at a temperature of 120° to 130° F. After extraction, the hexane contained 18 to 25 percent oil and the extracted flakes contained about 1.4 percent oil. The flakes were then desolventized to remove any residual solvent. The oil was separated from the flakes by counter-current extraction.

The terms and expressions which have been employed are used as terms of description and not of limitation, and it is not intended in the use of such terms and expressions to exclude any equivalents of the features shown and described or portions thereof, since it is recognized that various modifications are possible within the scope of the invention claimed.

What is claimed is:

1. A method for extracting oil from oil-bearing seeds comprising grinding oil-bearing seeds having a moisture content below about 5 percent to a particle size such that they will pass through a No. 8 U.S. Standard Screen, moisturizing the ground seeds to a moisture level of up to about 9 percent, heating the ground moisturized seeds to a temperature of from about 100° to about 220° F., subjecting said ground moisturized seeds to mechanical action to rupture the cells containing the oil in said seeds and extracting the oil from said seeds by the use of a solvent.

2. A method for extracting oil from oil-bearing seeds as defined in claim 1, wherein the oil-bearing seeds are ground to a particle size such that they will pass through a No. 10 U.S. Standard Screen.

3. A method for extracting oil from oil-bearing seeds as defined in claim 2, wherein the moisturized material is flaked to rupture the cells containing the oil in said seeds.

4. A method for extracting oil from oil-bearing seeds as defined in claim 1, wherein the oil-bearing seeds are corn germ.

5. A method for extracting oil from oil-bearing seeds as defined in claim 3, wherein the oil is extracted by the use of hexane under atmospheric pressure.

6. A method for extracting oil from oil-bearing seeds as defined in claim 5, wherein the extraction is carried out in a temperature range of from about 120° to about 130° C.

7. A method for extracting oil from oil-bearing seeds as defined in claim 3, wherein the seeds, after being ground, are moistured to a moisture level in the range of from about 6 to about 8 percent.

8. A method for extracting oil from oil-bearing seeds as defined in claim 7, wherein the seeds, prior to being ground, have a moisture content below about 3 percent.

References Cited
UNITED STATES PATENTS

| | | | |
|---|---|---|---|
| 2,280,046 | 4/1942 | Musher | 260—412.2 |
| 2,579,526 | 12/1951 | Vix et al. | 260—412.8 |
| 2,618,643 | 11/1952 | Dunning | 260—412.2 |
| 2,727,914 | 12/1955 | Gastrock et al. | 260—412.8 |
| 2,847,282 | 8/1958 | Dunning et al. | 260—412.8 |

JOHNNIE R. BROWN, Primary Examiner

UNITED STATES PATENT OFFICE
CERTIFICATE OF CORRECTION

Patent No. 3,786,078　　　　　　　Dated January 15, 1974

Inventor(s) De Wayne W. Finley et al.

It is certified that error appears in the above-identified patent and that said Letters Patent are hereby corrected as shown below:

1) Column 3, line 10; "flasking" should read --flaking--.

2) Column 4, line 18; "°C" should read --°F--.

3) Column 4, line 21; "moistured" should read --moisturized--.

Signed and sealed this 20th day of August 1974.

(SEAL)
Attest:

McCOY M. GIBSON, JR.　　　　　C. MARSHALL DANN
Attesting Officer　　　　　　　Commissioner of Patents